United States Patent
Ambs

(10) Patent No.: US 6,229,760 B1
(45) Date of Patent: May 8, 2001

(54) INTEGRATED STREAMER ACOUSTIC POD

(75) Inventor: Loran Ambs, Fulshear, TX (US)

(73) Assignee: Western Geco, Houston, TX (US)

( * ) Notice: Subject to any disclaimer, the term of this patent is extended or adjusted under 35 U.S.C. 154(b) by 0 days.

(21) Appl. No.: 09/285,224

(22) Filed: Apr. 1, 1999

(51) Int. Cl.$^7$ .................................................. G01V 1/38
(52) U.S. Cl. ............................................. 367/16; 367/76
(58) Field of Search ........................... 367/16, 154, 76, 367/127, 125, 24

(56) References Cited

U.S. PATENT DOCUMENTS

| | | | |
|---|---|---|---|
| 4,912,684 | * | 3/1990 | Fowler ................................. 367/76 |
| 5,031,159 | * | 7/1991 | Rouquette ............................ 367/125 |
| 5,359,575 | * | 10/1994 | Williams et al. .................... 367/127 |
| 6,091,670 | * | 7/2000 | Oliver et al. ......................... 367/76 |

* cited by examiner

Primary Examiner—Jay Patidar
Assistant Examiner—Victor J. Taylor
(74) Attorney, Agent, or Firm—Alan J. Atkinson

(57) ABSTRACT

An apparatus and system for integrating acoustic pods within marine seismic streamers. The integrated acoustic pod eliminates the attachment and detachment of acoustic pods from the streamer exterior surface when the seismic streamers are deployed into and retrieved from the water. Control electronics are integrated within the streamer interior and receive electric power from a streamer electrical conductors and receive control signals from a streamer control wire. The control electronic components can be integrated within the streamer interior or within modules connecting each streamer section. Acoustic transducer elements can extend through the connector module or can be attached to the connector module exterior. The acoustic transducer elements can be oriented to steer transmission of acoustic energy into the water, such as in a horizontal azimuth, and to permit correction of the steering direction.

20 Claims, 1 Drawing Sheet

INTEGRATED STREAMER ACOUSTIC POD

BACKGROUND OF THE INVENTION

The present invention relates to the field of acoustic pods attached to seismic streamers in marine geophysical operations. More particularly, the invention relates to an acoustic pod integrated with the streamer.

Marine seismic streamers are towed behind a seismic vessel in geophysical operations. Acoustic pods and other devices are attached to the streamer exterior to generate signals indicating the streamer section location. Acoustic pods typically include control electronics, waveform generator, and detection circuitry. The acoustic pods sometimes rotate axially around the streamer to maintain the vertical orientation of the acoustic pods as the streamers rotate in the water.

Control signals for controlling the acoustic pod operation are typically transmitted through the streamer exterior surface with electromagnetic devices. However, electric power for conventional acoustic pods is supplied with batteries attached to the acoustic pod exterior of the streamer. The acoustic pods and integrated battery are attached to the streamer exterior as the streamer is deployed from a tow vessel into the water, and are removed from the streamer exterior as the streamer is withdrawn from the water with storage reels.

Conventional acoustic pod deployment is inefficient for several reasons. Batteries are expensive and have a relatively short life of approximately thirty days. To replace depleted or nearly depleted batteries, seismic data collection must cease while the streamer is recovered aboard the seismic vessel or a streamer maintenance vessel locates and replaces the discharged battery. With the increased length and breadth of marine seismic arrays, there is increased demand for acoustic power from the acoustic pods. This increased demand drains the batteries even more rapidly and requires more frequent battery changes.

Conventional acoustic pods are attached to the streamer exterior and generate additional drag in the water. Such drag wastes fuel and generates undesirable "noise" which contaminate the desired seismic signal. Dangling acoustic pods present surface discontinuities which snag other streamers, fishing nets, aqueous vegetation, and otherwise increase streamer damage.

In addition to these limitations, deployment and retrieval of acoustic pods requires significant handling time on the seismic vessel deck. The dangling acoustic pods cannot be stored on the streamer reels, and must be removed when the streamers are stored on board the vessel deck. Such deployment and retrieval requires many personnel hours, delays data gathering operations, and significantly adds to the cost of seismic operations.

Because of these limitations, a need exists for an improved technique for deploying acoustic pods with marine seismic streamers.

SUMMARY OF THE INVENTION

The present invention provides an apparatus and a system for transmitting acoustic energy in water. The apparatus is engagable with a marine seismic streamer deployed in water which has an electrical conductor and a control wire. A housing is integrated within the streamer, and control electronics means is positioned within said housing for generating an acoustic signal. The control electronics means is engaged with the electrical conductor for receiving electric power and is engaged with the control wire for receiving control signals. The control electronics means, which can be positioned in the streamer or connector module, can include control electronics, a waveform generator, or detection circuitry. Acoustic transducer elements can be engaged with a module connecting adjacent streamer sections, and the control electronics can control the activation time of acoustic transducer elements to steer transmission of acoustic energy into the water. A controller can dynamically modify the steering of the transmitted acoustic energy in response to changes in the orientation of the connector module.

The system described by the invention includes a controller means, at least two marine seismic streamer sections each incorporating at least one electrical power transmission conductor and at least one signal control wire engaged with said controller means, and at least one connector module for connecting adjacent streamer sections to form a marine seismic streamer and for connecting said electrical conductors and said control wires. A control electronics means is positioned within at least one connector module for transmitting acoustic energy into the water, and the control electronics means is engaged with the electrical conductor for receiving electric power and is engaged with the control wire for receiving control signals.

DESCRIPTION OF THE PREFERRED EMBODIMENTS

Figure 1:
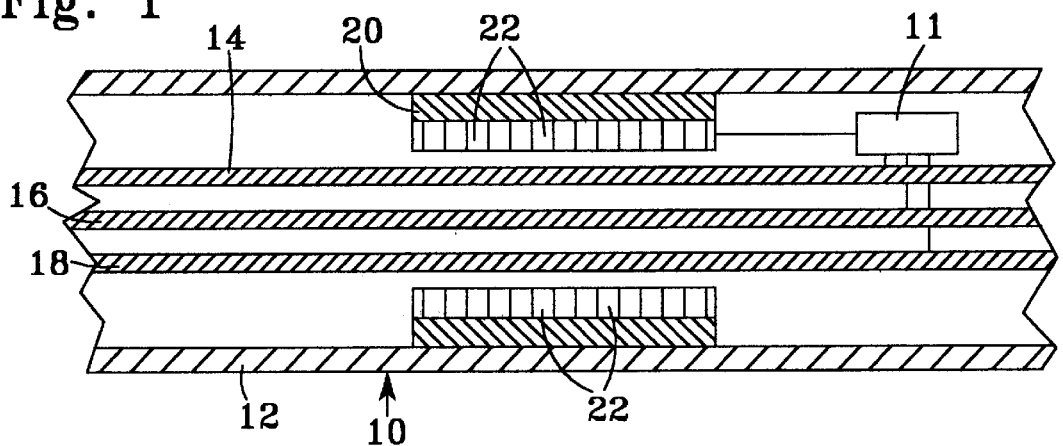
FIG. 1 illustrates a housing and electronic components positioned within a streamer section.

The invention describes an apparatus and system for generating acoustic energy in water. FIG. 1 illustrates marine seismic streamer 10 having controller 11 within streamer section 12. A plurality of streamer sections 12 form streamer 10, and streamer 10 can be towed through the water with a seismic vessel or can be deployed as a bottom cable on the bottom of the water column. Electrical conductor 14 provides electric power through streamer 10, and control wire 16 provides signal transmission through streamer 10. Wire pairs can provide the combination of electrical power and control signals. Control wire 16 can comprise an electrical conductor, fiber optic cable, or other signal transmission material. By providing for multiplexed or modulated transmission, electrical conductor 14 can simultaneously provide power transmission and control signal transmission capabilities. Telemetry conductor 18 can also provide for independent transmission of telemetry information. Although only three wires and conductors are illustrated, conventional marine seismic streamers contain multiple wires.

Housing 20 and controller 11 within control electronic components 22 are integrated within streamer section 12 as illustrated. Housing 20 can comprise a frame, cylinder, printed circuit board, elastic case, or other structural form. Electronic components 22 can include acoustic transducer elements and other functional components as described below. Such location permit streamers 10 to be wound on a storage reel without requiring removal of acoustic components associated with housing 14. This feature eliminates the streamer handling necessary to attach and detach acoustic pods in conventional systems. Electronic components 22 and the integrated circuitry are powered with electrical conductor 14 instead of batteries conventionally used. This feature eliminates operational down-time due to battery failure and replacement. Additionally, the battery weight is removed from the streamer, reducing the towed weight of streamer 10 and reducing stresses acting on streamer section 10. Signals can be transmitted between controller 11 and control wire 16 or telemetry conductor 18 without requiring separate transmission systems or signal transmission through the exterior surface of streamer section 12. By locating housing 20 and electronic components 22 with controller 11 within streamer section 12, drag on such elements is substantially eliminated, thereby requiring less power to tow streamer 10.

Electronic components 22 can comprise acoustic transducers for generating acoustic energy or an acoustic signal in water. Although the terms "acoustic energy" and "acoustic signals" can have different meanings, such terms are used interchangeably herein. In another embodiment of the invention, electronic components 22 are capable of detecting or receiving acoustic signals or acoustic energy transmitted through the water. Electronic components 22 can include various control circuits, waveform generators, data recorders, power amplifiers, and other devices. In other embodiments of the invention, electronic components are capable of performing other functions useful in seismic geophysical operations. Acoustic transducers can be configured to form a three dimensional array or can be oriented to steer the transmission of acoustic signals or acoustic energy in different directions. In one embodiment of the invention, acoustic energy is transmitted in a horizontal azimuth for detection by other devices such as receivers of other acoustic transducers engaged with other streamers 10, stationary in the water, or towed by a seismic vessel.

Figure 2:
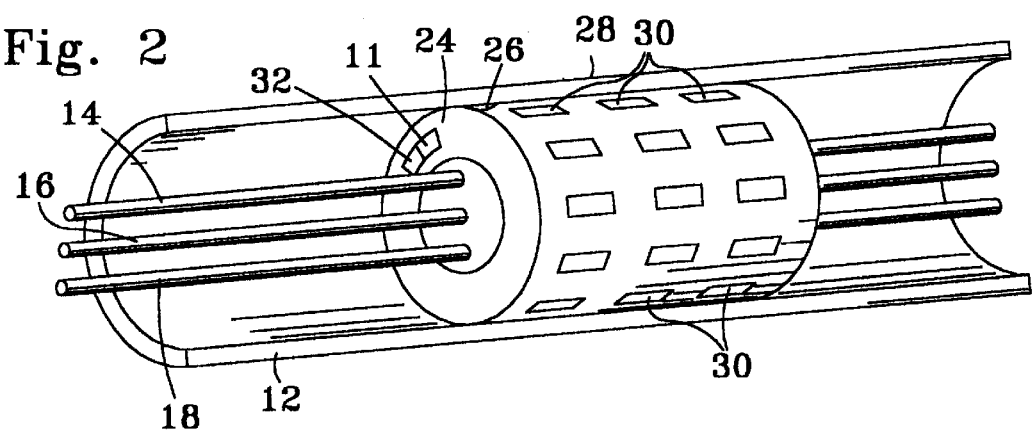
FIG. 2 illustrates acoustic transducers extending through the exterior wall.

FIG. 2 illustrates another embodiment of the invention wherein housing 24 is positioned within streamer section 12 so that exterior surface 26 of housing 24 contacts an interior surface of streamer section exterior wall 28. Housing 24 can be segmented or monolithic. Acoustic transducers 30 are engaged with housing 24 and with controller 11 and extend through apertures through exterior wall 28 so that acoustic transducers 30 contact the water. Acoustic transducers 30 do not penetrate exterior wall 28 so that watertight integrity is maintained with minimal impact on transmission efficiency. As illustrated, acoustic transducers 30 are positioned 360 degrees around housing 24 to provide operational flexibility. Controller 11 is capable of selectively activating selected acoustic transducers 30 to steer acoustic signals or acoustic energy in a selected direction. Such direction and beam width can be accomplished by the position, size, shape, or orientation of the selected acoustic transducers 30. Alternatively, controller 11 can direct a preferential array gain in a direction such as a horizontal plane with minimal directivity to surface reflected paths.

Orientation sensor 32 is engaged with controller 11 to detect changes in the bearing, dip, or rotation of streamer section 12 about a longitudinal axis through streamer section 12. Such information can be processed with controller 11 to modify the operation of selected acoustic transducers 30. For example, if streamer section 12 twists or rotates about its longitudinal axis, sensor 32 will detect such rotation and can cause controller 11 to vary the activation of acoustic transducers 30 so that the acoustic energy discharged outwardly from housing remains in the same approximate direction. In this fashion, transmission of acoustic energy in a horizontal azimuth to controller 11 or receivers in adjacent streamers is maintained regardless of streamer section 12 orientation.

Figure 3:
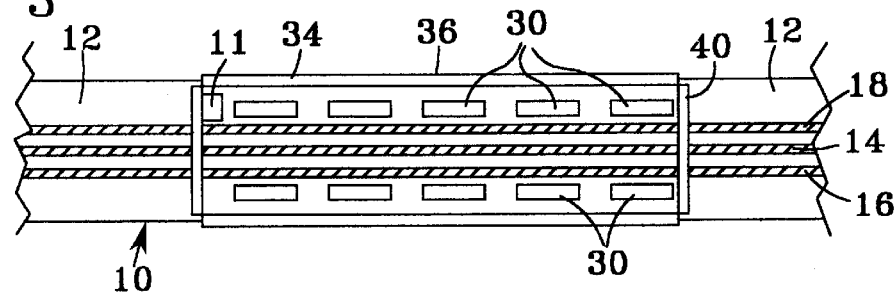
FIG. 3 illustrates electronic components located within a connector module for adjacent streamer sections.

FIG. 3 illustrates another embodiment of the invention wherein a housing such as connector module 34 having exterior surface 36 links adjacent streamer sections 12 to form streamer 10. Connector module 34 also connects interior components such as electrical conductor 14, control wire 16, and telemetry conductor 18. Controller 11 is positioned within connector module 34 for the purposes described above. In one embodiment of the invention, acoustic transducers 30 are engaged with controller 11 and with connector module 34. Acoustic transducers 30 can be attached to exterior surface 36 as illustrated in FIG. 3, can extend through apertures in exterior surface 36, or can be positioned in other ways.

Figure 4:
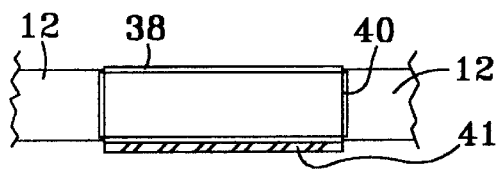
FIG. 4 illustrates a rotating collar for orienting a housing to vertical.

FIG. 4 illustrates connector module 38 having rotatable collar 40 attached to acoustic transducers 30. Collar 40 is weighted with weight 41 to maintain the same vertical orientation regardless of the orientation of connector module 38. In this manner, rotation of streamer sections 16 and attached connector module 38 about a longitudinal axis does not change the relative orientation of acoustic transducers 30. The electrical connection between acoustic transducers and an electric power source can be maintained with slip rings or other conventional links.

Figure 5:
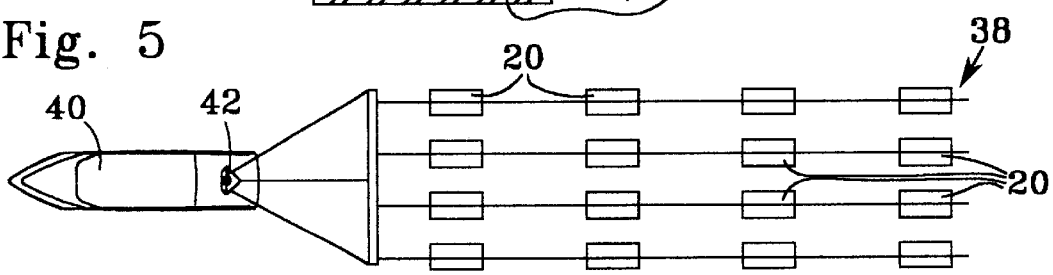
FIG. 5 illustrates multiple devices positioned within a multiple streamer array.

FIG. 5 illustrates one use of the invention in a multiple streamer array 38 behind seismic vessel 40. By eliminating drag caused by conventional pods, additional acoustic devices having housings 20 and electronics components 22 such as controller 11 can be placed within streamers 10 than is practicable with conventional systems. An increased number of such devices improves the spatial resolution of adjacent streamers 10 or sources and increases the information available for other data processing functions. Control processor 42 on vessel 40 or located at a land-based installation manages operation of individual components and receives data from such components.

The invention further provides a system having a means such as control processor 42, at least two marine streamer sections 12 attached with a connector module 34, and control electronic components 22 such as controller 11 and acoustic transducers 23 positioned within connector module 34. The control electronic components 22 are capable of generating acoustic energy in the water, and are engaged with control wire 16 for data communication with controller 42. Control signals, operating power, and other communications can be transmitted to and from electronic components 22 through a single conductor or through multiple wires and conductors. Electronic components 22 are capable of steering acoustic energy transmission through the water, and are further capable of receiving acoustic signals transmitted through the water.

The invention is applicable to seismic streamers towed through water or placed on the surface underlying the water column. For towed streamers, the removal of acoustic pods exterior of the streamers reduces drag and significantly reduces acoustic "noise" generated by acoustic pods towed through the water. This reduction in noise simplifies data processing techniques necessary to remove such signals, and improves the signal-to-noise ratio of seismic data. This feature improves the quality of seismic data and detection rate and reduces false detections of the acoustic positioning pulse.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus for engagement with a marine seismic streamer deployed in water, wherein said streamer includes an electrical conductor and a control wire, said apparatus comprising:
   a housing inside of the streamer; and
   control electronics means positioned within said housing inside of the streamer for generating an acoustic signal, wherein said control electronics means is engaged with said control wire for receiving electric power, and wherein said control electronics means is engaged with said control wire for receiving control signals.

2. An apparatus as recited in claim 1, wherein said control electronics means comprises an acoustic pod having control electronics and a waveform generator.

3. An apparatus as recited in claim 2, further comprising detection circuitry within said acoustic pod.

4. An apparatus as recited in claim 1, wherein said housing comprises a connector module for attaching seismic streamer sections, and wherein said connector module has an exterior surface.

5. An apparatus as recited in claim 4, further comprising acoustic transducer elements engaged with said connector module.

6. An apparatus as recited in claim 5, wherein said connector module has an exterior surface, and wherein said acoustic transducer elements extend through said connector module exterior surface.

7. An apparatus as recited in claim 5, wherein said acoustic transducer elements are attached to said connector module exterior surface.

8. An apparatus as recited in claim 5, wherein said acoustic transducer elements are configured to form a three dimensional array.

9. An apparatus as recited in claim 5, further comprising a controller engaged with said acoustic transducer elements for steering transmission of acoustic energy into water around the marine seismic streamer.

10. An apparatus as recited in claim 9, wherein said housing is segmented.

11. An acoustic pod apparatus for engagement with marine seismic streamer sections deployed in water, wherein each streamer section includes an electrical conductor and a control wire, said acoustic pod apparatus comprising:
    at least one connector module having an exterior surface substantially similar to the streamer sections for connecting adjacent streamer sections to form a marine seismic streamer; and
    control electronics means positioned within at least one connector module for generating an acoustic signal, wherein said control electronics means is engaged with said electrical conductor for receiving electric power, and wherein said control electronics means is engaged with said control wire for receiving control signals.

12. An apparatus as recited in claim 11, wherein said connector module has an exterior surface in contact with the water, and further comprising acoustic transducer elements engaged with said control electronics means.

13. An apparatus as recited in claim 12, wherein said acoustic transducer elements are attached to said connector module exterior surface.

14. An apparatus as recited in claim 12, wherein said acoustic transducer elements are arranged on said connector module exterior surface in a selected orientation to permit steering transmission of acoustic energy into the water in response to control signals from said control electronics means.

15. An apparatus as recited in claim 14, wherein said control electronics means and said acoustic transducer elements are capable of steering acoustic energy transmission in a horizontal azimuth.

16. An apparatus as recited in claim 15, wherein said control electronics means and said acoustic transducer elements are capable of steering acoustic energy transmission in a horizontal azimuth as the orientation of said connector module changes in the water.

17. A system for generating acoustic energy in water for marine seismic operations, comprising:
    a controller means;
    at least two marine seismic streamer sections each incorporating an electrical power transmission conductor and a signal control wire engaged with said controller means;
    at least one connector module having an exterior surface substantially similar to the streamer sections for connecting adjacent streamer sections to form a marine seismic streamer and for connecting said electrical conductors and said control wires; and
    control electronics means positioned within at least one connector module for transmitting acoustic energy into the water, wherein said control electronics means is engaged with said electrical conductor for receiving electric power, and wherein said control electronics means is engaged with said control wire for receiving control signals.

18. A system as recited in claim 17, wherein said control electronics means is capable of steering transmission of said acoustic energy into the water.

19. A system as recited in claim 17, wherein said electrical power transmission conductor and said signal control wire comprise a single conductor.

20. A system as recited in claim 17, wherein said control electronics means includes a detection circuit for detecting acoustic energy conducted through the water.

* * * * *